(12) United States Patent
Azagury et al.

(10) Patent No.: US 6,529,962 B1
(45) Date of Patent: Mar. 4, 2003

(54) PRESERVING THREAD IDENTITY DURING REMOTE CALLS

(75) Inventors: Alain Azagury, Nesher (IL); Michael Factor, Haifa (IL); Yosef Moatti, Haifa (IL); Zvi Rosberg, Haifa (IL); Eyal Zangi, Zi'Hon Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,174

(22) Filed: Feb. 9, 1999

(30) Foreign Application Priority Data

Feb. 5, 1999 (EP) .............................. 99200308

(51) Int. Cl.⁷ ................................................ G06F 9/46
(52) U.S. Cl. ........................................ 709/330; 709/229
(58) Field of Search ................................ 709/310–332, 709/102–108, 229, 225, 217–219; 370/389; 714/4; 710/200, 220, 240–246

(56) References Cited

U.S. PATENT DOCUMENTS

| 5,187,790 A | * | 2/1993 | East et al. .................. 709/316 |
| 5,189,667 A | * | 2/1993 | Esaki et al. ................. 370/389 |
| 5,202,971 A | * | 4/1993 | Henson et al. ................. 707/8 |
| 5,218,699 A | * | 6/1993 | Brandle et al. ............. 709/304 |
| 5,321,841 A | * | 6/1994 | East et al. .................. 709/107 |
| 5,345,588 A | * | 9/1994 | Greenwood et al. ........ 709/107 |
| 5,617,570 A | * | 4/1997 | Russell et al. .............. 709/312 |
| 5,724,588 A | * | 3/1998 | Hill et al. .................... 709/304 |
| 5,794,047 A | * | 8/1998 | Meier ............................ 714/4 |
| 5,802,371 A | * | 9/1998 | Meier ............................ 714/4 |
| 5,812,844 A | * | 9/1998 | Jones et al. ................. 709/104 |
| 6,125,382 A | * | 9/2000 | Brobst et al. ............... 709/102 |
| 6,170,018 B1 | * | 1/2001 | Voll et al. ................... 709/330 |
| 6,182,108 B1 | * | 1/2001 | Williams et al. ............ 709/102 |
| 6,189,046 B1 | * | 2/2001 | Moore et al. ............... 709/315 |
| 6,226,689 B1 | * | 5/2001 | Shah et al. ................. 709/314 |
| 6,282,581 B1 | * | 8/2001 | Moore et al. ............... 709/316 |

* cited by examiner

Primary Examiner—St. John Courtenay, III
Assistant Examiner—Van H. Nguyen
(74) Attorney, Agent, or Firm—Manny W. Schecter

(57) ABSTRACT

A method for performing remote calls between source and target computing machines includes running a program thread on the source machine which invokes a remote call to the target machine. The remote call is transmitted to the target machine, the call including an identifier associated with the program thread. A response to the remote call is received from the target machine, the response including the identifier, whereby the response is returned to the program thread on the source machine using the identifier.

2 Claims, 8 Drawing Sheets

PRESERVING THREAD IDENTITY DURING REMOTE CALLS

FIELD OF THE INVENTION

The present invention relates generally to methods of computing using remote calls between a local and a remote computer platform, and specifically to methods for preventing deadlock during such remote calls.

BACKGROUND OF THE INVENTION

Multitasking using a plurality of threads within a program is well known in the art. Multithread programming is described, for example, in "The Java Language Environment: A White Paper," by James Gosling and Henry McGilton, published by Sun Microsystems, Inc., which is incorporated herein by reference. Use of more than one thread in a program allows multiple sequences of steps or states to be carried out by the program in parallel, by attaching a thread to each of the sequences. In the present patent application, the term thread refers to a sequence of steps carried out by the program. A thread has a thread identity as well as a priority.

In "Hooked on Java," by van Hoff et al., published by Addison-Wesley Publishing Company, which is incorporated herein by reference, the authors explain in Chapter 5 that deadlock occurs when two or more threads are unable to continue because they are waiting on each other indefinitely. The authors outline some strategies for avoiding deadlock in threaded programs, including, where possible, avoiding creating more than one thread to execute methods. The authors further suggest trying to hold locks (explained in more detail below) created by threads for the shortest time possible.

When a thread obtains a lock for an object for the first time, an identity of the locking thread is recorded in the lock. On subsequent attempts by the thread to lock the same object, the system validates that this thread is the one recorded as "owning" the lock, and if so, allows the thread to proceed. Other threads attempting to use the locked object are locked out, and must wait until the original thread releases the lock. A deadlock occurs if a thread $T_1$ holds a lock $L_1$ and requests a lock $L_2$, while a thread $T_2$ holds lock $L_2$ and requests lock $L_1$. Deadlock of multiple threads on a single machine can generally be avoided by careful programming.

In modern network environments, a program (or program thread) running on a local computing machine will frequently invoke operation of a program on another, remote machine via a network, and will then receive the results back from the remote machine. Such invocation is referred to as a remote call. Depending on the nature program invoked, the remote machine may also respond with a callback to the local machine, i.e., with a remote call of its own. Remote Method Invocation (RMI) enables a programmer to create an object whose methods can be invoked on a remote computer. In "Using Java" by Joseph Weber, et al., published by Que Corporation, which is incorporated herein by reference, the authors describe in Chapter 40 steps involved in implementing a remote object for use in RMI. However, using RMI, or any other remote procedure call known in the art, breaks local-remote transparency and can lead to deadlocks, as described below.

Threaded programs running on a local and on a remote machine need to make remote calls between the machines. In so doing, each remote call leads to creation of a new thread on a respective target machine (either the local or the remote machine). In the event that the target machine then makes a callback to the local machine, the original thread identity and/or priority is not preserved.

FIG. 1 is a schematic diagram illustrating a generation of deadlock caused by this process, as is known in the art. A thread T1, running on a source machine 10, locks an object 16 and makes a remote call to a target machine 12, thereby invoking a method 14. The invoked method executes in a thread T2 running on target machine 12. During execution of this method, thread T2 makes a remote callback to source machine 10, which creates a new thread T3 on machine 10. If thread T3 tries to perform a lock on object 16, it will be unable to do so, and a deadlock will occur. Execution of a similar process in a single machine (without remote calls) will not cause any deadlocks, since for a single machine all locks are executed by the same thread. Thus, although it would be desirable for remote calls using RMI to be "transparent" to the programmer, i.e., to require no special attention to the fact that the desired method is invoked on a remote, rather than local, processor, in actuality the programmer must take particular care to avoid such deadlocks.

SUMMARY OF THE INVENTION

It is an object of some aspects of the present invention to provide methods for the preservation of local-remote transparency within a computer programming environment.

It is a further object of some aspects of the present invention to provide methods to prevent deadlock within a computer program operating on a local and a remote platform.

It is a yet further object of some aspects of the present invention to provide methods to preserve a thread identity within a computer program operating on a local and a remote platform.

In preferred embodiments of the present invention, when a first program thread running on a source machine makes a remote call to a target machine, the remote call includes an identification of the thread. When the target machine receives the remote call, it generates a second thread to carry out whatever method or methods are required by the call, and associates the identification with the second thread. If the target machine must then make a callback to the source machine, the identification is further associated with the callback. When the source machine receives the callback, it is able, using the identification associated therewith, to determine the identity of the first thread and, thus, to perform any method required by the callback using the first thread. As a result, the thread is allowed access to any objects that had previously been locked by the first thread on the source machine, and the possibility of deadlock due to the callback is avoided. It will be appreciated that any number of successive mutual callbacks between source and remote machines may be handled in this fashion.

In some preferred embodiments of the present invention, a remote transmission system on a source machine comprises a method relay manager (MRM) object and a thread supply object, which generates a thread responsive to a command from the MRM object. A target machine has a similar remote transmission system, comprising an MRM object and a thread supply object substantially similar to those on the source machine. All remote calls and corresponding callbacks between the machines are transmitted and received via the respective MRM objects, which use their respective thread supply objects to preserve an identity of a thread associated with a remote call from one of the machines to the other and then returned to the original machine.

By utilizing substantially similar systems in both the source and target machines, local-remote transparency is maintained, while the possibility of deadlocks occurring is eliminated by preserving the identity of the thread during the performance of remote calls and associated callbacks.

In some preferred embodiments of the present invention, the identity of the thread associated with the call and callbacks is preserved using one or more intermediate threads generated on one or both machines during a transmission of the call. The identities of the intermediate threads are modified, responsive to instructions from either the source or the target machine, so as to maintain consistency with thread naming conventions, such as conventions associated with Java language programming.

In some preferred embodiments of the present invention, an identity of a lock is used to record an owner of the lock associated with the thread when the remote call is made. The identity of the lock is transferred with the remote call, and the lock identity, rather than the identity of the thread, is used in initially locking objects and in order to gain access to already locked objects, thus avoiding deadlock situations.

Preferred embodiments of the present invention are particularly useful when making remote calls using a synchronized method, as is commonly employed in Java language programming. For example, the present invention may be implemented using Java Remote Method Invocation (RMI), as described hereinabove, with the thread identification The principles of the present invention may be employed in substantially any processing environment that uses remote procedure calls.

There is therefore provided, in accordance with a preferred embodiment of the present invention, a method for performing remote calls between source and target computing machines, including:

running a program thread on the source machine which invokes a remote call to the target machine;

transmitting the remote call to the target machine, the call including an identifier associated with the program thread; and receiving a response to the remote call from the target machine, the response including the identifier, whereby the response is returned to the program thread on the source machine using the identifier.

Preferably, transmitting the remote call includes generating at least one intermediate thread for routing the identifier.

Preferably, generating the at least one intermediate thread includes generating a thread to perform the remote call on the target machine, which thread generates a callback to the invoking thread on the source machine.

Alternatively, generating the at least one intermediate thread includes generating threads on the source and target machines, wherein the threads on the source and target machines are generated by substantially similar methods running on the source and target machines.

Preferably, transmitting the remote call includes incorporating an identity of the program thread and context parameters of the program thread in the identifier.

Alternatively, incorporating the identity of the program thread in the identifier includes generating an intermediate thread on the target machine whose thread name incorporates the identity.

Further alternatively, incorporating the identity of the program thread in the identifier includes altering the identifier responsive to information comprised in the remote call.

Preferably, incorporating the identity of the program thread in the identifier includes altering the identifier responsive to information comprised in the response to the remote call.

Preferably, running the program thread includes transmitting the remote call and receiving the response in a manner substantially transparent to a programmer using the method.

Alternatively, running the program thread includes utilizing the identifier so as to gain access to an object locked by the invoking thread, whereby a deadlock does not occur.

Preferably, transmitting the remote call includes incorporating an identity of a lock generated by the program thread in the identifier.

Preferably, the source machine and the target machine include Java Virtual Machines.

Alternatively, transmitting the remote call includes performing Remote Method Invocation in a program running in Java.

Preferably, transmitting the remote call includes placing a TCP/IP call.

There is further provided, in accordance with a preferred embodiment of the present invention, a computing machine, which runs a program thread that invokes a remote call to a target machine, the computing machine including a method relay manager, which transmits the remote call to the target machine, including an identifier associated with the program thread, such that a response to the remote call is received from the target machine, wherein the response including the identifier, so that the method relay manager returns the response to the invoking program thread using the identifier.

Preferably, the method relay manager generates at least one intermediate thread, which routes the remote call.

Preferably, the target machine includes a second method relay manager, which receives the remote call from the computing machine and which generates the response from the target machine responsive to the remote call.

Preferably, the method relay managers are substantially similar.

Alternatively, the computing machine includes a first thread supply object, and the target machine includes a second thread supply object, which objects respectively supply intermediate threads which route the remote call responsive to a request from their respective method relay managers.

Preferably, the thread supply objects are substantially similar.

Alternatively, the method relay manager includes a remote transmission method followed by the manager responsive to the remote call and to the response to the remote call.

Further alternatively, the method relay manager transmits the remote call and receives the response to the remote call in a manner substantially transparent to a programmer using the machine.

Preferably, the method relay manager carries out a Java remote method invocation process.

Alternatively, the remote invocation process incorporates an identity of a lock generated by the program thread in the identifier.

There is further provided, in accordance with a preferred embodiment of the present invention, a computer program product having computer-readable program code stored therein, responsive to which code a source machine runs a program thread which invokes a remote call to a target machine and transmits the remote call to the target machine, the call including an identifier associated with the program thread, wherein upon receiving a response to the remote call from the target machine, the response including the identifier, the source machine returns the response to the invoking program thread using the identifier.

The present invention will be more fully understood from the following detailed description of the preferred embodiments thereof, taken together with the drawings in which:

DETAILED DESCRIPTION OF PREFERRED EMBODIMENTS

Figure 1:
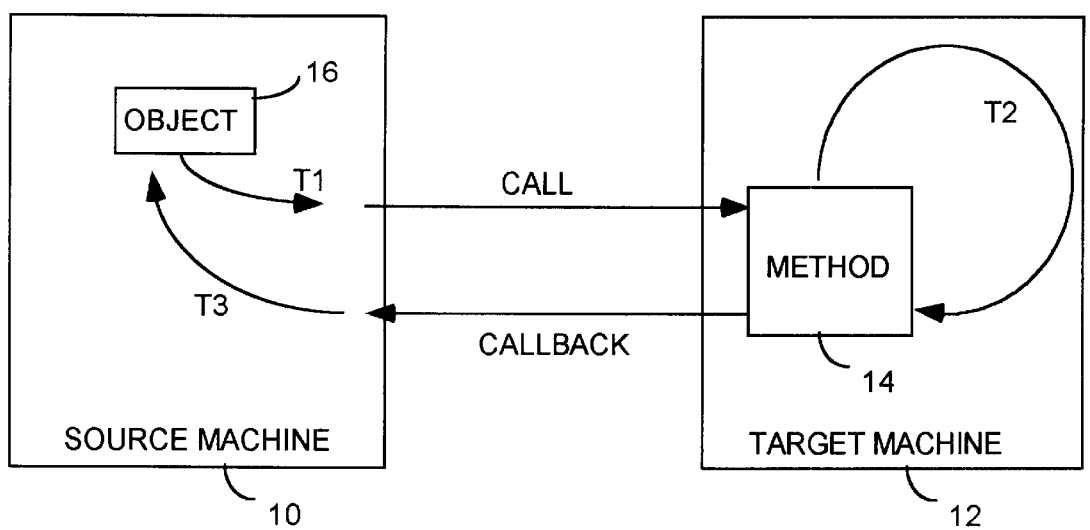
FIG. 1 is a schematic diagram illustrating a generation of deadlock caused by a remote call, as is known in the art.
Figure 2:
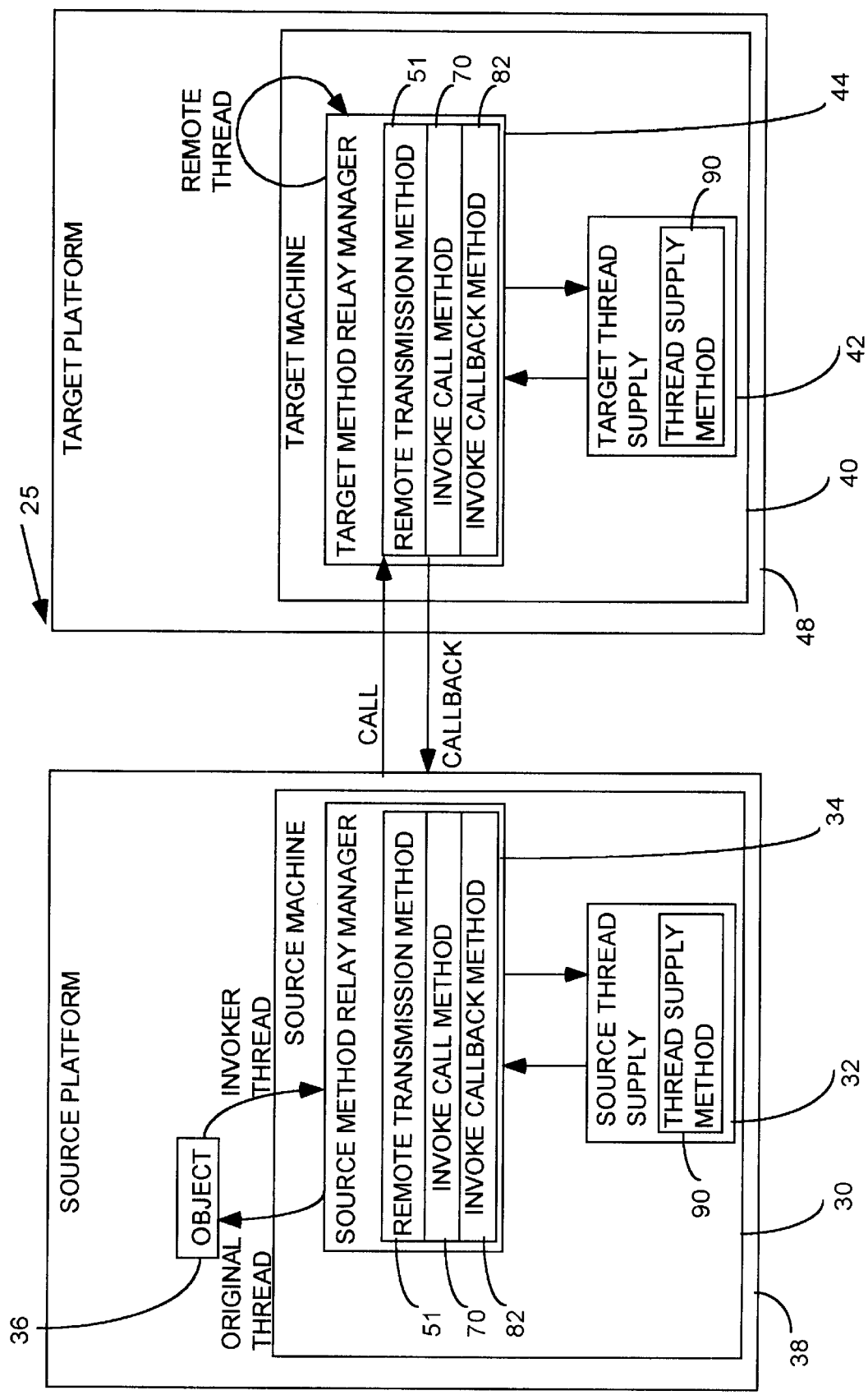
FIG. 2 is a schematic block diagram of a system for transferring calls between a source and a target machine which are remote from each other, in accordance with a preferred embodiment of the present invention.

Reference is now made to FIG. 2, which schematically illustrates a system 25 for transferring calls between a source machine 30 and a target machine 40 which are remote from each other, in accordance with a preferred embodiment of the present invention. Preferably, calls placed between the machines are remote calls based on a locking mechanism, such as RMI, as described in the Background of the Invention. Source machine 30 preferably comprises software processes operating on a source platform 38, and target machine 40 comprises software processes operating on a target platform 48. Preferably, source machine 30 and target machine 40 comprise Java Virtual Machines. Source platform 38 and target platform 48 may comprise any industry-standard computers capable of running the respective machines. For example, platform 38 may be a personal computer operating under a Windows operating system, and platform 48 may be a computer operating under a Macintosh operating system.

A program object 38 running on source platform 38 initiates a remote transmission, herein termed a call, to target machine 40. Most preferably, a program thread, herein termed an invoker thread, is associated with the call. Source machine 30 comprises a source thread supply object 32 and a source method relay manager (MRM) object 34. Target machine 40 comprises a target thread supply object 42 and a target MRM object 44. Thread supply objects 32 and 42 are substantially similar, in that the code generating them is preferably substantially identical, and in that each thread supply object invokes a thread supply method 90 described in detail below. Most preferably, thread supply objects 32 and 42 supply a substantially unlimited number of different threads as required for use by MRM objects 34 and 44, respectively. MRM objects 34 and 44 are substantially similar, in that the code generating them is preferably substantially identical, and in that each MRM object invokes a remote transmission method 51, an invoke call method 70, and an invoke callback method 82, which methods are described below.

As described in detail hereinbelow, the call from object 36 is routed via source MRM 34 and then via target MRM 44. A remote transmission generated in machine 40 in response to the call, herein termed a callback, is routed via target MRM 44 and then via source MRM 34 back to source machine 30. MRM objects 34 and 44 respectively utilize thread supply objects 32 and 42 in order to generate one or more threads, herein termed intermediate threads, which are utilized in routing the call and the callback.

Specifically, the two MRM objects assign "tags" to the remote calls and callbacks, which include the identity of the invoker thread and thread context parameters. These tags are then used to assign thread names to the intermediate threads, so that the invoker thread initially associated with object 36 and a return thread returning to object 36 have the same thread identity. Thus, deadlocks are prevented. Furthermore, the substantially identical functions of the MRMs and their respective thread supply objects maintain local-remote transparency of system 25.

Figure 3:
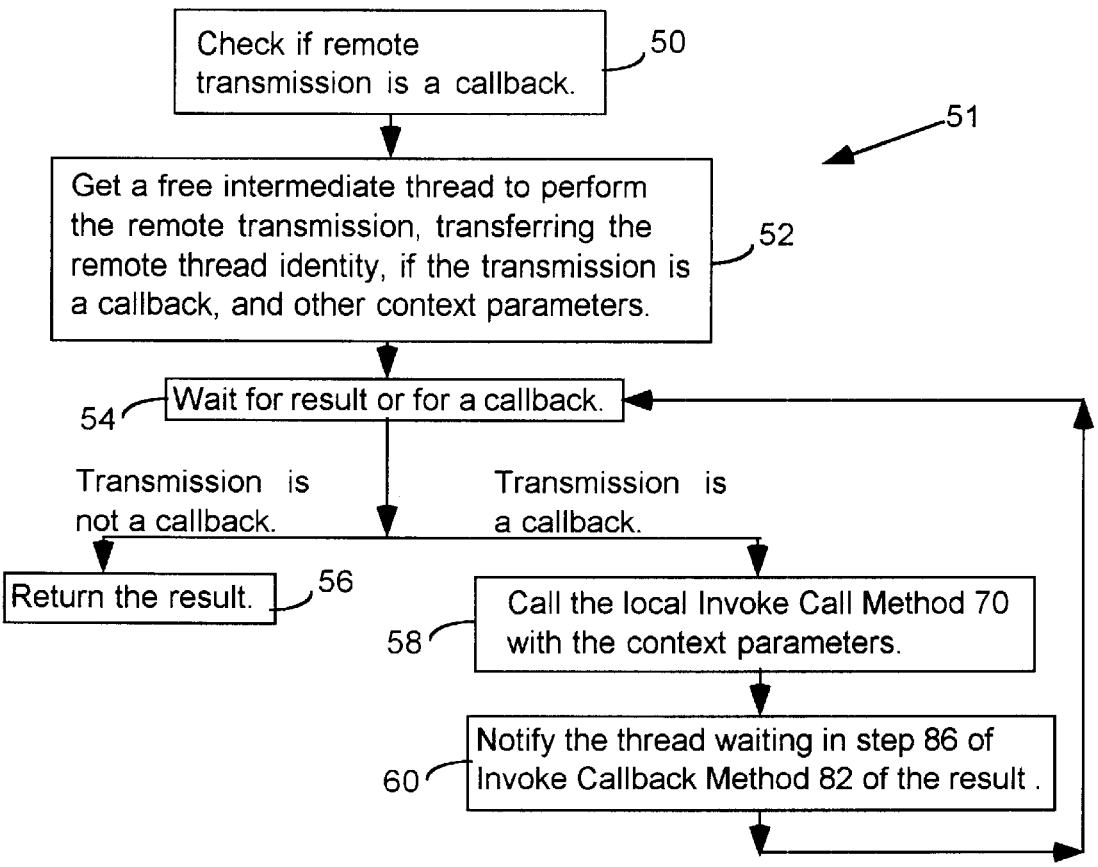
FIG. 3 is a flowchart that schematically illustrates a remote transmission method carried out by the system shown in FIG. 2, in accordance with a preferred embodiment of the present invention.

FIG. 3 is a flowchart schematically illustrating remote transmission method 51 carried out by MRM object 34, according to a preferred embodiment of the present invention. (It will be understood that MRM object 44 on target machine 40 carries out a substantially identical method when remote calls are invoked on the target machine.) Remote transmission method 51 is invoked by all remote transmissions made by machine 30, and routes the path of a thread associated with each transmission according to the type of remote transmission. At an identification step 50, MRM 34 determines whether the remote transmission has been initiated locally, for example, by object 36, or is to be a callback, responsive to a call received from MRM 44 of machine 40. Preferably, MRM 34 identifies a callback on the basis of the "tag" attached to the call.

Figure 6:
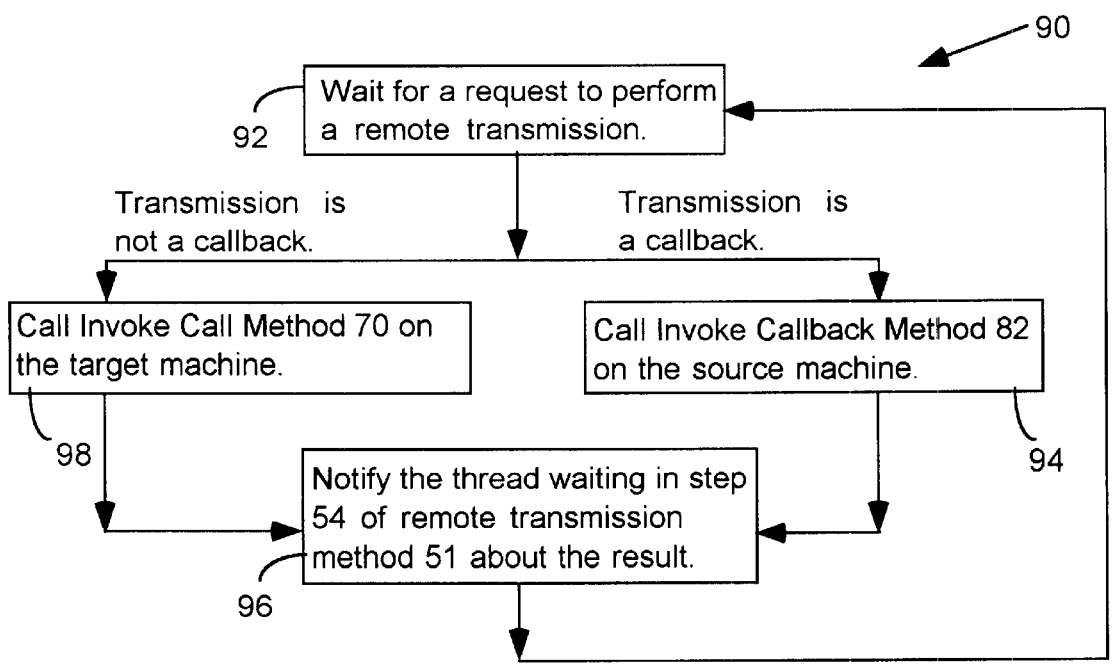
FIG. 6 is a flowchart that schematically illustrates a thread supply method carried out by the system shown in FIG. 2, in accordance with a preferred embodiment of the present invention.

At a thread generation step 52, MRM 34 obtains an intermediate thread from thread supply object 32, using a thread supply method 90 running on object 32 (FIG. 6). In the event that the transmission is a callback, MRM 34 determines the identity of the remote thread and other context parameters of the thread, such as priority, and incorporates the identity and other parameters into the intermediate thread. Otherwise, the intermediate thread contains identification of the invoker thread running on machine 30, i.e., the thread that initiated the call.

After the intermediate thread has been obtained, MRM 34 sends the transmission to MRM 44 and waits in a waiting step 54 for a return transmission from MRM 44. The return transmission may be either a result or a callback. If the return transmission is a result (not a callback), method 51 continues to a step 56, wherein the result is returned to the invoker thread. If the return transmission is a callback, machine 30 continues by calling invoke call method 70, to make the required local call using the context parameters of the intermediate thread, in a step 58. When the result of method 70 is received, machine 30 passes the result to another intermediate thread, which passes on the results of the callback. Machine 30 then returns to step 54 and waits for the next result or callback response from machine 40.

Figure 4:
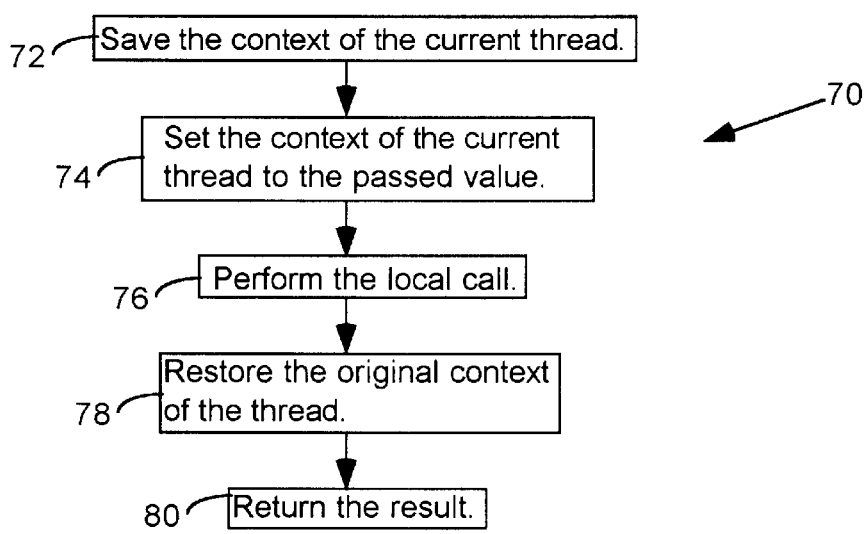
FIG. 4 is a flowchart that schematically illustrates a call invocation method carried out by the system shown in FIG. 2, in accordance with a preferred embodiment of the present invention.

FIG. 4 is a flowchart schematically illustrating invoke call method 70, according to a preferred embodiment of the present invention. Invoke call method 70 is used in step 58 of remote transmission method 51 to assign a name and context to the intermediate thread to be used in a local call (on machine 30 or 40), using the Java "getName" and "setName" methods, for example. Method 70 enables the call to be performed by the intermediate thread in such a manner that after the call has been performed, the identity of the thread associated with the original call is restored.

In an initial step 72 of method 70, an original context of the current thread (of method 51) is saved. The values of the context parameters are passed to the intermediate thread assigned for carrying out the local call in a change name step 74. The local call is then performed in a call perform step 76 and a result obtained. After the local call has been performed, the context of the current thread is restored to its original (saved) context in a thread name restoration step 78, and the current thread returns the result to method 51 in a final step 80.

Figure 5:
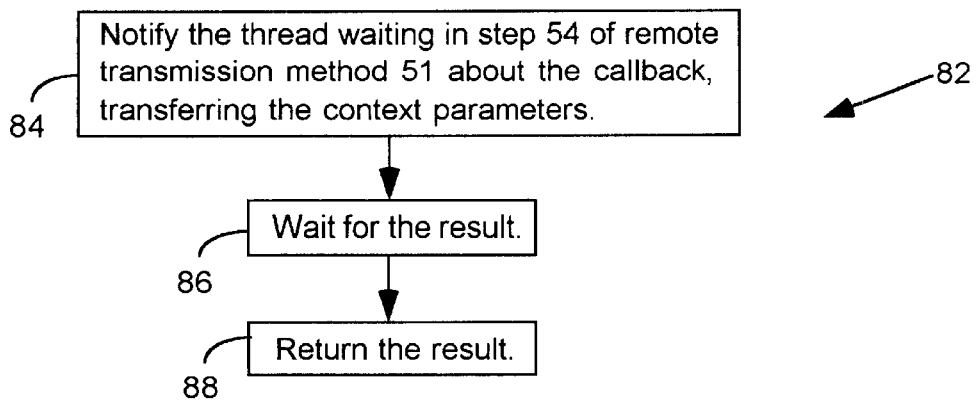
FIG. 5 is a flowchart that schematically illustrates a callback invocation method carried out by the system shown in FIG. 2, in accordance with a preferred embodiment of the present invention.

FIG. 5 is a flowchart schematically illustrating invoke callback method 82 used at step 60 in method 51, according to a preferred embodiment of the present invention. Invoke callback method 82 is called by thread supply object 32 or 42 when the remote transmission to be made is a callback. In an initial step 84 of method 82, the context parameters of the intermediate thread associated with the callback are passed to the invoker thread waiting in step 54 of remote transmission method 51. In a waiting step 86, method 82 waits for a result, which it receives from step 60 of remote transmission method 51. In a final step 88 method 82 returns the result to object 36. Use of invoke callback method 82 for calls based on a locking mechanism, together with supply method 90 (described below), enables method 51 to correctly identify the thread in the callback received from machine 40, and also to distinguish between an initial call and a callback.

FIG. 6 is a flowchart schematically illustrating supply method 90 carried out by both thread supply objects 32 and 42, according to a preferred embodiment of the present invention. In the present example, supply method 90 generates an intermediate thread in response to a call received from its associated method relay manager 34 running on source machine 30. In an initial step 92, method 90 waits until a request is received from MRM 34 to perform a remote transmission. If the remote transmission is a callback, local invoke callback method 82 is called in step 94. If the remote transmission is a not a callback, invoke call method 70 is called on target machine 40 in step 98. In a notification step 96, the thread waiting in step 54 of the remote transmission method is informed of the result of whichever method has been utilized, after which method 90 returns to waiting step 92.

The following tables (Tables A–D) show how the steps described hereinabove interrelate for the process shown in FIG. 2, using an example wherein a call and successive callbacks are placed. Source machine 30 places a remote call to target machine 40, which determines that it needs to make its own call back to machine 30 in order to complete the original remote call. Thus, the callback from machine 40 requires a corresponding callback from machine 30. All of these steps are carried out using the methods shown in FIGS. 3–6, while preserving the identity of the thread on machine 30 that invoked the original call.

The tables also comprise explanations of the steps implemented in the process. The explanations state at which points a first and a second intermediate thread, respectively termed IT1 and IT2, are generated by the process. In the tables, the names of the methods as described hereinabove are abbreviated as follows: remote transmission method, RTM; thread supply method, TSM; invoke call method, ICM; invoke callback method, ICBM. Steps of the respective methods are shown by their number in the tables, and horizontal arrows are used in the tables to show when a first method calls a second method.

TABLE A

Source Machine 30

| Step in RTM 51 | Step in TSM 90 | Explanation |
|---|---|---|
| 50 | | Process initiated by object 36 as a remote transmission with an invoker thread. |
| 52 | → 92 | Since this is a remote call, intermediate thread IT1, comprising context parameters of the invoker thread from object 36, is generated. |
| 54 | 98 | Since this is a call, step 98 applies, so that invoke call method 70 on target machine 40 is called. The invoker thread waits. A call to target machine 40 is placed, together with parameters of thread IT1. |

The process continues as shown in Table B.

TABLE B

Target Machine 40

| Step in ICM 70 | Step in RTM 51 | Step in TSM 90 | Explanation |
|---|---|---|---|
| 72 | | | Call from source machine 30, starting a new intermediate thread IT2 on the target machine and saving its context. |
| 74 | | | Set the context of the current thread to the value of thread IT1. |
| 76 | | | Perform the call locally on machine 40. |
| | → 50 | | Start callback routine. |
| | → 52 | → 92 | Since this is a callback, start TSM 90 on machine 40, incorporating identity of remote thread IT1 and other context parameters. |
| | 54 | | Wait for the result of the callback. |
| | waits | 94 | Call ICBM 82 on source machine 30. A callback to source machine 30 is placed, together with |

TABLE B-continued

Target Machine 40

| Step in ICM 70 | Step in RTM 51 | Step in TSM 90 | Explanation |
|---|---|---|---|
| | | | the context of intermediate thread IT2. |

The process continues as shown in Table C.

TABLE C

Source Machine 30

| Step in ICBM 82 | Step in RTM 51 | Step in ICM 70 | Explanation |
|---|---|---|---|
| 84 | → 54 | | This is a callback, so invoker thread waiting in step 54 of RTM 51 is so informed, and the context of the thread is transferred to step 54 of RTM 51 and then to step 72 of ICM 70, as shown below. |
| 86 waits | | | Wait for the result |
| | 58 | → 72 | Since this is a callback, ICM 70 is started with the transferred thread context parameters, and the context of the current thread is saved (to be restored in step 78 of ICM 70). |
| | | 74 | The current thread context is changed to the passed value of context of the callback intermediate thread IT2. Note that this is also the context of the invoker thread of object 36. |
| | | 76 | The local call on source machine 30 is performed. |
| | | 78 | The thread context is changed back to the context saved in step 72. |
| | 58 | ← 80 | The thread waiting in step 86 of ICBM 82 receives the result of the call. |
| 88 | ← 60 | | The result is returned to target machine 40. The process continues as shown in Table D below. |
| | 54 waits | | Wait for the result. |

TABLE D

| Target Machine 40 | | Source Machine 30 | |
|---|---|---|---|
| Step in TSM 90 | Step in RTM 51 | Step in RTM 51 | Explanation |
| 96 | → 54 | | The result from step 88 on source machine 30 is returned to step 96 of TSM 90 on target machine 40, |

TABLE D-continued

| Target Machine 40 | | Source Machine 30 | |
|---|---|---|---|
| Step in TSM 90 | Step in RTM 51 | Step in RTM 51 | Explanation |
| | | | which then notifies the call in RTM 51 waiting for the result (as shown above in Table B). |
| 92 | | | TSM 90 returns to waiting for a remote call. |
| | 56 | | RTM 51 on target machine 40 returns the result, along with the identity of thread IT1, to waiting step 54 on source machine 30. |
| | | 54 | RTM 51 on source machine 30 receives the result and the identity of the return thread in waiting step 54. |
| | | 56 | RTM 51 on source machine 30 returns the result with the identity of the return thread, identifying the original thread that began the process. |

The process illustrated by tables A–D, whereby a first intermediate thread is generated on source machine 30 and a second intermediate thread is generated on target machine 40, ensures that the identity of the return thread is substantially identical to the identity of the invoker thread, so that conflicts such as deadlock which would have occurred in the absence of system 25 are avoided.

In a preferred embodiment of the present invention, system 25 is conveniently implemented in Java using Remote Method Invocation (RMI) on any suitable platform. Preferably, the thread identities are conveyed between the source and target machines by introducing the thread names and context parameters as arguments of the RMI command.

Figure 7:
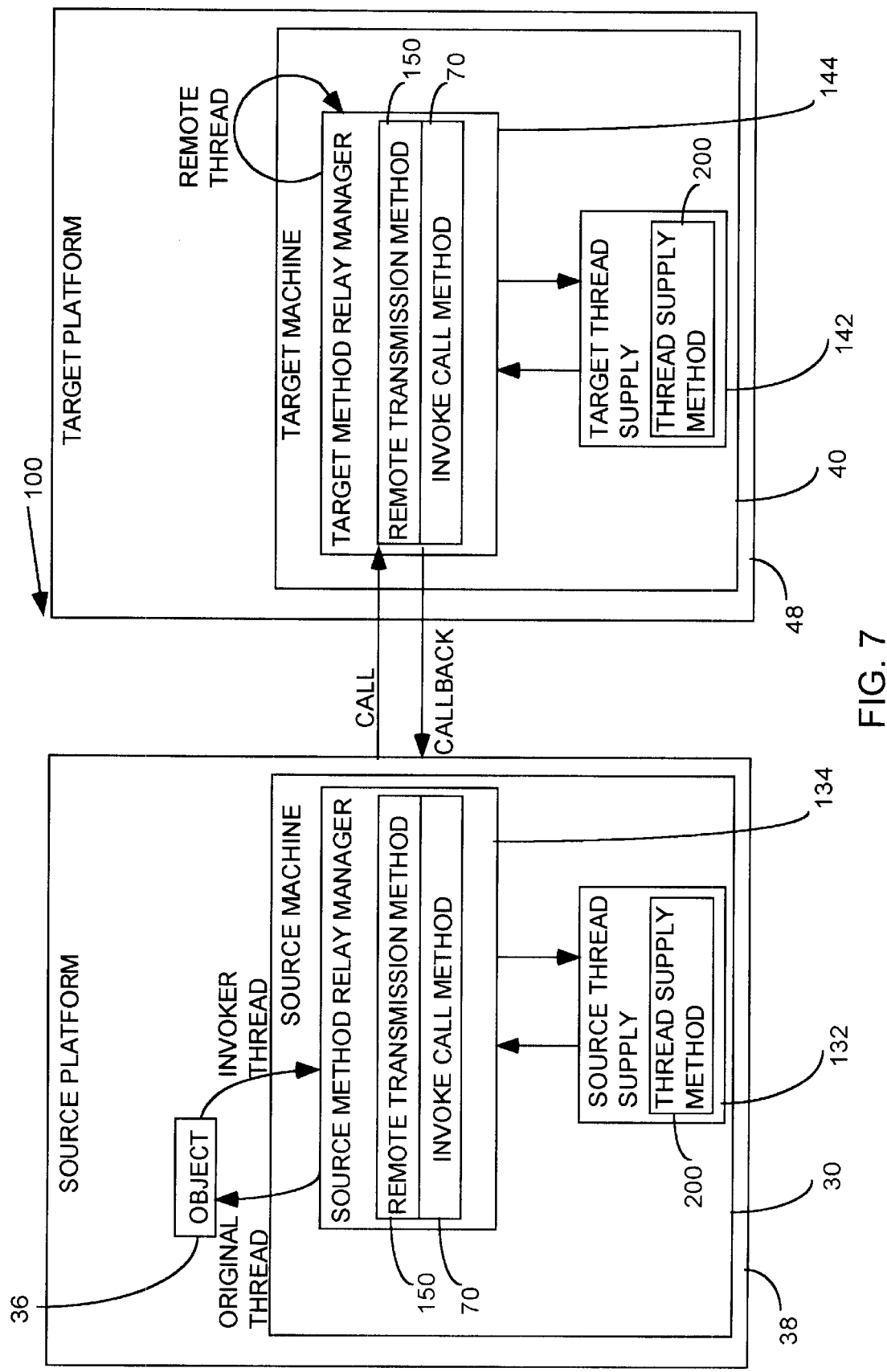
FIG. 7 is a schematic block diagram of a system for transferring calls between a source and a target machine which are remote from each other, in accordance with an alternative preferred embodiment of the present invention.

Reference is now made to FIG. 7, which schematically illustrates a system 100 for transferring calls between source machine 30 and target machine 40, in accordance with an alternative preferred embodiment of the present invention. Apart from the differences described hereinbelow, the operation of system 100 is generally similar to that of system 25, so that elements indicated by the same reference numerals in both systems 25 and 100 are generally identical in construction and in operation. Preferably, calls placed between the machines of system 100 are remote calls based on a system without a locking mechanism, such as TCP/IP. Because the calls do not use a locking mechanism, invoke callback method 82 is not required.

Source machine 30 comprises a source thread supply object 132 and a source MRM object 134. Target machine 40 comprises a target thread supply object 142 and a target MRM object 144. MRM objects 134 and 144 are substantially identical, and each MRM object invokes, on its respective machine, two substantially identical methods, comprising invoke call method 70 (as described hereinabove with reference to FIG. 4) and remote transmission method 150. Thread supply objects 132 and 142 are substantially identical, and each thread supply object invokes, on its respective machine, a thread supply method 200 described in detail below.

Figure 8:
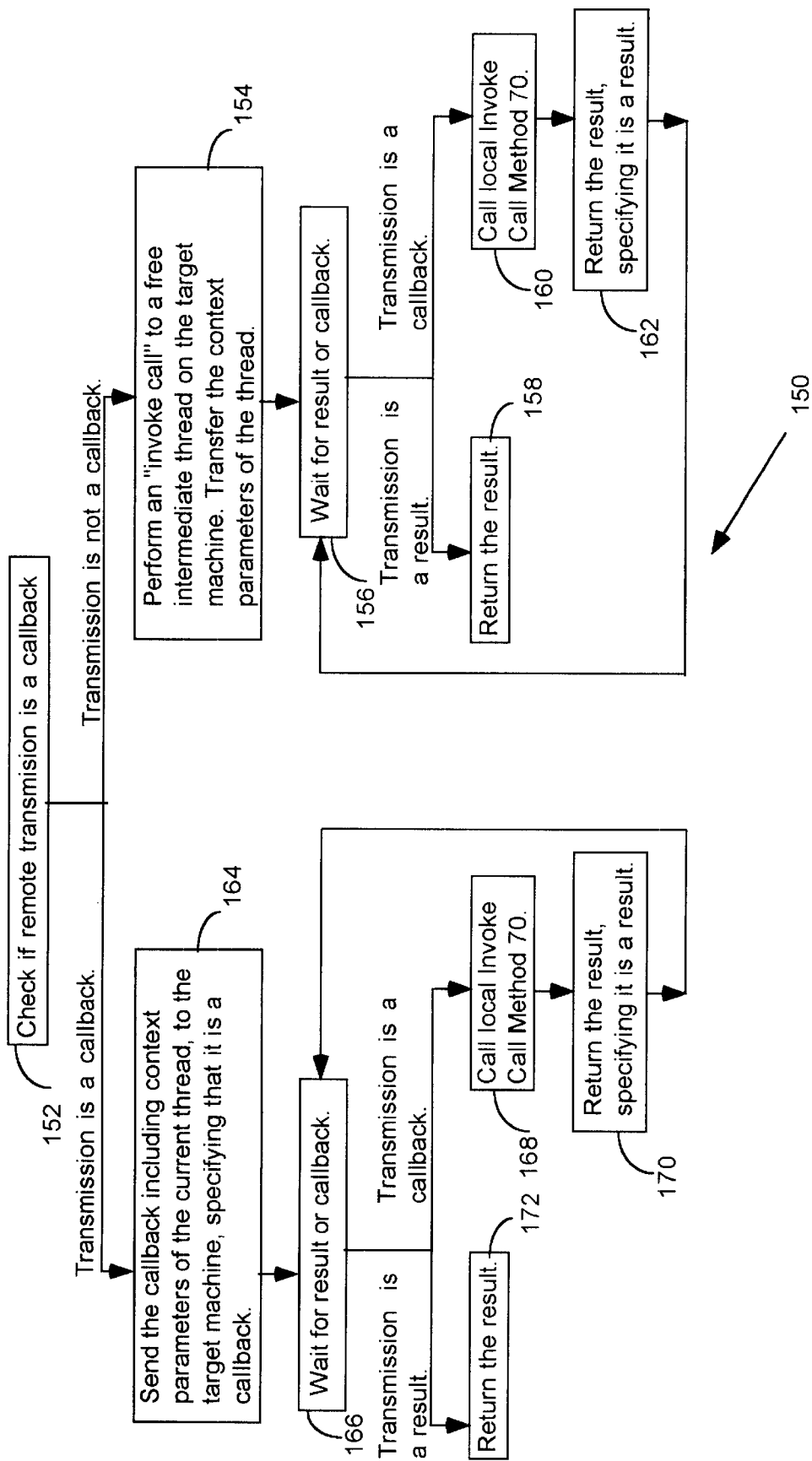
FIG. 8 is a flowchart that schematically illustrates a remote transmission method carried out by the system shown in FIG. 7, in accordance with an alternative preferred embodiment of the present invention.

FIG. 8 is a flowchart schematically illustrating remote transmission method 150 carried out respectively by MRM objects 134 and 144 (FIG. 7) of system 100, according to an alternative preferred embodiment of the present invention. In an initial step 152, a remote transmission to be made by machine 30, for example, is checked to determine whether it is or is not a callback. In the event that the transmission is not a callback, an intermediate thread generating step 154 is performed, in which MRM 134 invokes a call on target machine 40, which uses or generates the intermediate thread using context parameters of the invoker thread passed to machine 40.

Machine 30 then waits for a result or for a callback request from target machine 40 in a waiting step 156. If at step 156 a callback is received from machine 40, then the callback is implemented in a step 160 by calling local invoke call method 70. The result is returned in a step 162. The system then returns to waiting step 156. If step 156 receives a result from machine 40, then the result is returned to the invoker thread in step 158.

If the remote transmission at step 152 is a callback, then the callback, is sent to the target machine in a transfer step 164, specifying that the transmission is a callback. The callback includes context parameters of the current (intermediate) thread, generated in thread supply method 200, as described hereinbelow. Step 164 is the "mirror image" of step 154, wherein the context parameters of the intermediate thread were generated in target machine 40. The intermediate thread then waits for a result or a callback in a waiting step 166. If step 166 receives a callback from the target machine, then the callback is implemented in a step 168 by calling local invoke call method 70. The result is then returned to the target machine in a step 170, and machine 30 returns to waiting step 166. If a result is received at step 166, then the result is returned to the intermediate thread in step 172.

Figure 9:
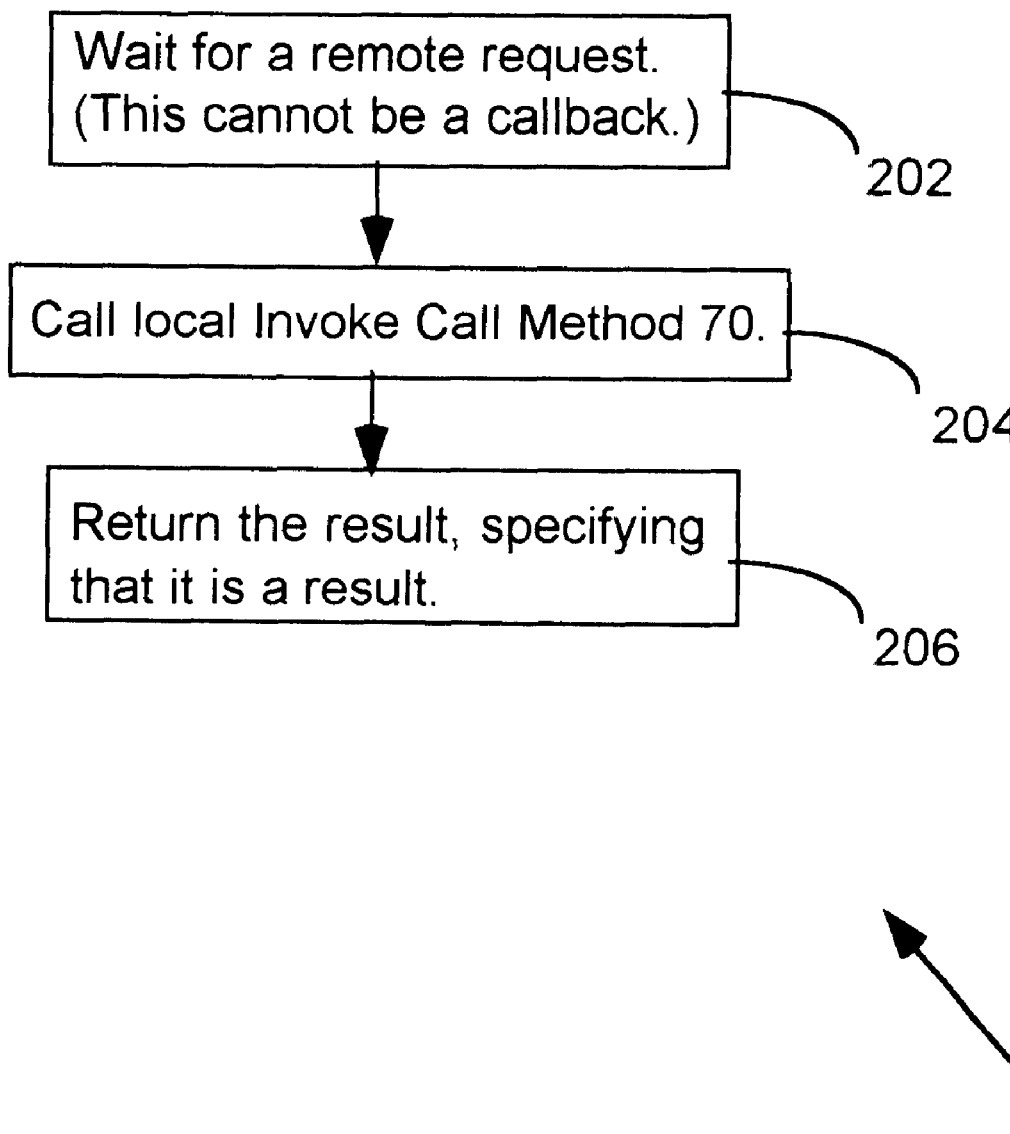
FIG. 9 is a flowchart that schematically illustrates a thread supply method carried out by the system shown in FIG. 7, in accordance with an alternative preferred embodiment of the present invention.

FIG. 9 is a flowchart schematically illustrating thread supply method 200, carried out by thread supply objects 132 and 142 (FIG. 7) of system 100, according to an alternative preferred embodiment of the present invention. In the present example, method 200 is carried out by target thread supply method 142 in response to a remote call from source MRM 134. In an initial step 202, the thread supply object waits until it receives a remote request from step 154 of remote transmission method 150, whereupon the intermediate thread is generated. Local invoke call method 70 is then called in a step 204, which provides the thread identity as a result. In a final step 206, the result is returned to step 154 of remote transmission method 150.

The following tables (Tables E–H) show how the steps described hereinabove interrelate for the process shown in FIG. 7, wherein a call is placed from source machine 30 to target machine 40, followed by a callback from the target machine to the source machine and a resultant callback from the source machine to the target machine. Tables E–H have substantially the same form as tables A–D above.

TABLE E

| Step in RTM 150 | | Explanation |
|---|---|---|
| 152 | | Process initiated as a call with an invoker thread. |
| 154 | → | Since this is a call, not a callback, TSM 200 and ICM 70 are initiated on target machine 40, as described in table F below. The context parameters of the invoker |

TABLE E-continued

| Step in RTM 150 | Explanation |
|---|---|
| 156 | thread are passed to machine 40. The invoker thread waits for a result or a callback. |

The call is made to target machine 40. The process continues as shown in Table F below.

TABLE F

Target Machine 40

| Step in TSM 200 | Step in ICM 70 | Step in RTM 150 | Explanation |
|---|---|---|---|
| 202 | | | Remote call received from source machine 30. An intermediate thread is used, or generated if required. |
| 204 | → 72 | | The context of the invoker thread passed to machine 40 is saved. |
| | 74 | | Set the context of the intermediate thread to the passed value of the invoker thread context. |
| | 76 | | Perform the call local to machine 40. |
| | | → 152 | Start callback routine. |
| | | 164 | Since this is a callback, send context of the intermediate thread to source machine 30. |
| | | 166 | The intermediate thread waits for a result. |

A callback to source machine 30 is performed. The process continues as shown in Table G below.

TABLE G

Source Machine 30

| Step in RTM 150 | Step in ICM 70 | Explanation |
|---|---|---|
| 160 | → 72 | The invoker thread waiting in step 156 is informed of a callback. The context of the intermediate thread transferred from remote machine 40 is saved. |
| | 74 | The context of the current thread, i.e., the invoker thread, is set to that of the intermediate thread. |
| | 76 | The local call is performed. |
| | 78 | The context of the current thread is restored to that of the invoker thread. |
| 162 | ← 80 | The result is returned from invoke call method 70 to step 162 in remote transmission method 150, and also to the target machine. |
| 156 | | The intermediate thread waits for a result. |

The process continues on target machine 40 as shown in Table H below.

TABLE H

| Target Machine 40 Step in RTM 150 | | Source Machine 30 Step in RTM 150 | Explanation |
|---|---|---|---|
| 172 | | | The intermediate thread waiting in step 166 on the target machine is informed of the result and informs the source machine. |
| | → | 158 | The intermediate thread waiting for a result in step 156 of the source machine receives the result, and returns the result to the invoker thread. |

The process illustrated by tables E–H for calls not having a locking mechanism, whereby the intermediate thread is generated on target machine 40, ensures that the identity of the return thread is substantially identical to the identity of the invoker thread, so that conflicts such as deadlock which would have occurred in the absence of system 100 are avoided. System 100 is preferably implemented using TCP/IP connections under Java Development Kit version 1.1.4, and can operate on any suitable platform, substantially without deadlocks.

Figure 10:
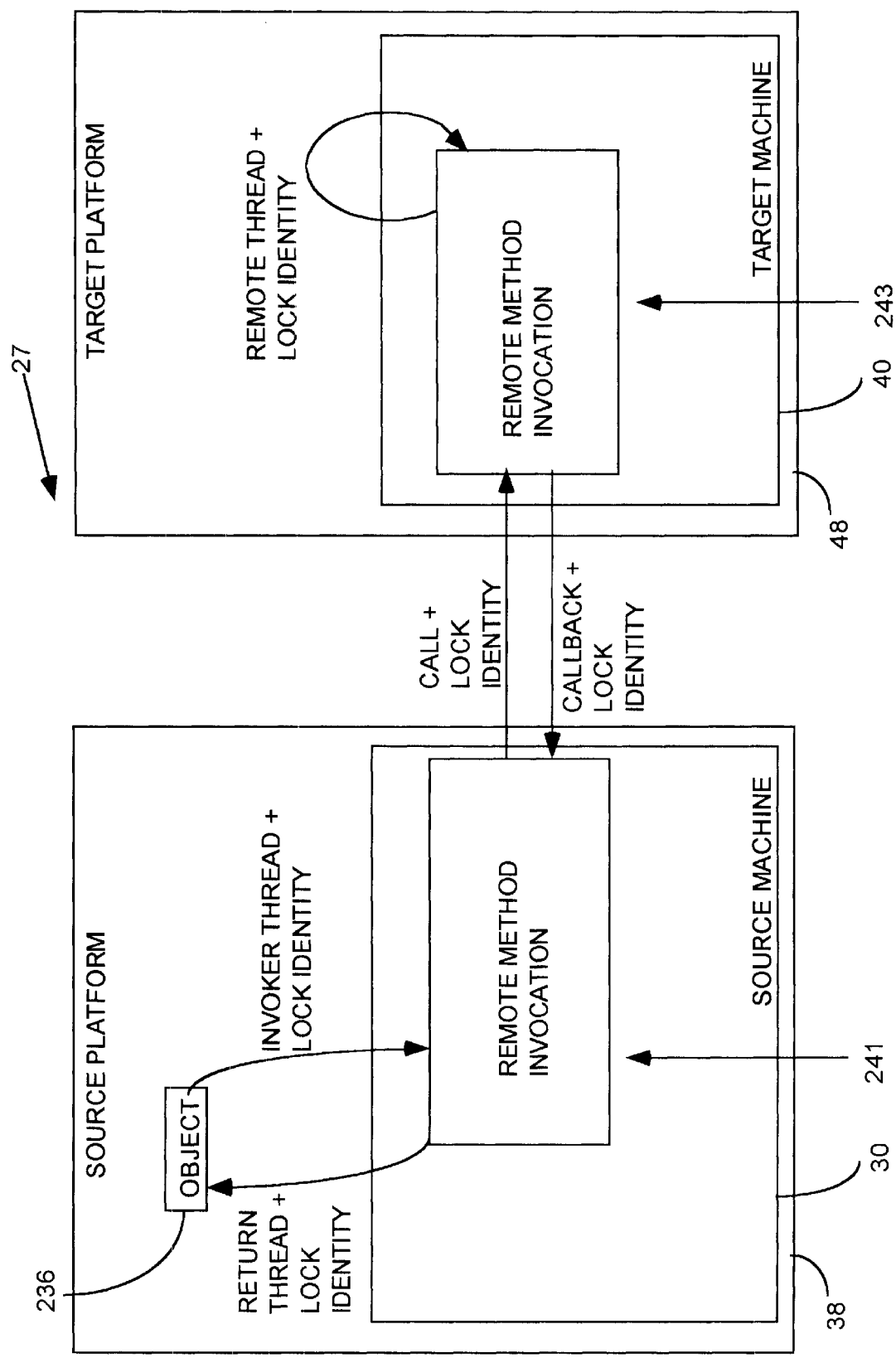
FIG. 10 is a schematic block diagram of a system for transferring calls between a source machine and a target machine, in accordance with a further alternative preferred embodiment of the present invention.

Reference is now made to FIG. 10, which schematically illustrates a system 27 for transferring substantially any type of remote call between source machine 30 and target machine 40, in accordance with a further alternative preferred embodiment of the present invention. As explained above, system 25 transfers the identities of threads and changes the thread identities, during the process of making a call and a callback, so that the thread identity always matches the lock of an object called by the thread. In system 27, each thread carries a lock identity, which is used to record the owner of the lock and enables a subsequent thread, invoked by a callback, to open locks created by a preceding thread. The lock identity preferably comprises a universally unique identifier, for example, the TCP/IP address of the local machine concatenated with a local identifier, such as an exact time of generation of the lock identity.

In system 27, when a thread attempts to get a lock on an object, the lock identity in the thread, and not the thread identity, is recorded as the lock owner. When source machine 30 makes a remote call, the lock identity is transferred to target machine 40 with the call, and the same lock identity is incorporated in a corresponding thread running on the target machine. If the thread on the target machine makes a remote call, either a callback or any other remote call, the same lock identity is transferred and is used to record objects locked while processing the call.

An object 236 on source platform 38 generates a remote call, and sends an invoker thread with a lock identity to a Java Remote Method Invocation process 241 comprised in source machine 30. Remote Method Invocation process 241 transfers the call and context parameters of the invoker thread, including the lock identity, to a corresponding Java Remote Method Invocation process 243 running target machine 40. A remote thread generated in target machine 40 uses the lock identity when it locks objects on the target machine. A callback from machine 40 to machine 30 (or any other remote call made by the remote thread) transfers the lock identity back to process 241 on machine 30. Once the callback or other remote call is received on the source machine, the lock identity is used to lock and unlock objects on the source machine.

Preferably, whenever a transfer is made from a first to a second thread, the lock identity is made available for use in the second thread, and is no longer available for use in the first thread. In other words, only one thread may use the lock identity at any one point in time.

Since the thread processing the callback uses the same lock identity as the invoker thread, there will not be a conflict between the two threads, and so deadlocks will be avoided. It will be appreciated, however, that system 27 cannot be used in a standard Java environment, which does not support lock identities separate from thread identities. Therefore, changes must be made accordingly in the Java Virtual Machines running on the source and target platforms.

The present invention may be applied on substantially any suitable hardware platform, and over any suitable type of communications or network link between the source and target platforms. Although in the preferred embodiments described hereinabove, the source and target machines each comprise a certain group of software processes running on a given hardware platform, it will be appreciated that other combinations and configurations of the software processes, as well as different combinations of hardware and software elements may similarly be used to carry out the present invention. The software required for carrying out the present invention may be transmitted over a network, as well as stored and/or distributed on tangible media, such as magnetic or optical storage media, as are known in the art. All such combinations and configurations of elements and all such software, however transmitted and stored, are considered to be within the scope of the present invention. It will thus be appreciated that the preferred embodiments described above are cited by way of example, and the full scope of the invention is limited only by the claims.

What is claimed is:

1. A method for preventing deadlock when performing remote calls between source and target computing machines, comprising:

running a first program thread on the source machine which invokes a remote call to the target machine, said first program thread maintaining a lock against access to an object unless a lock identity is presented;

transmitting said remote call to said target machine, said remote call including an identifier associated with said first program thread, said identifier comprising said lock identity, said lock identity being capable of permitting access to said object; and receiving a response to said remote call from said target machine, said response including said identifier, whereby said response is returned to said first program thread on said source machine by presenting said identifier and access to said object is provided by presenting said lock identity.

2. A program storage device readable by a computing machine, tangibly embodying a program of instructions executable by the machine to perform method steps of a method for preventing deadlock when performing remote calls between source and target computing machines, said method comprising:

running a first program thread on the source machine which invokes a remote call to the target machine, said first program thread maintaining a lock against access to an object unless a lock identity is presented;

transmitting said remote call to said target machine, said remote call including an identifier associated with said first program thread, said identifier comprising said lock identity, said lock identity being capable of permitting access to said object; and receiving a response to said remote call from said target machine, said response including said identifier, whereby said response is returned to said first program thread on said source machine by presenting said identifier and access to said object is provided by presenting said lock identity.

* * * * *